US008784113B2

(12) United States Patent
Bridges et al.

(10) Patent No.: US 8,784,113 B2
(45) Date of Patent: Jul. 22, 2014

(54) OPEN AND INTERACTIVE E-LEARNING SYSTEM AND METHOD

(76) Inventors: Aaron H Bridges, Portland, OR (US);
Jason S Day, Spokane, WA (US);
Joshua D Blank, Portland, OR (US);
Donald S Spear, West Linn, OR (US)

( * ) Notice: Subject to any disclaimer, the term of this patent is extended or adjusted under 35 U.S.C. 154(b) by 184 days.

(21) Appl. No.: 13/156,607

(22) Filed: Jun. 9, 2011

(65) Prior Publication Data
US 2011/0306027 A1 Dec. 15, 2011

Related U.S. Application Data

(60) Provisional application No. 61/397,797, filed on Jun. 15, 2010.

(51) Int. Cl.
*G09B 7/00* (2006.01)
(52) U.S. Cl.
USPC ............................................. 434/322; 726/27
(58) Field of Classification Search
None
See application file for complete search history.

(56) References Cited

U.S. PATENT DOCUMENTS

| | | | |
|---|---|---|---|
| 2002/0078050 A1 | 6/2002 | Gilmour | |
| 2003/0084345 A1* | 5/2003 | Bjornestad et al. | 713/201 |
| 2003/0175676 A1* | 9/2003 | Theilmann et al. | 434/350 |
| 2004/0015565 A1* | 1/2004 | Bednar et al. | 709/219 |
| 2004/0148408 A1* | 7/2004 | Nadarajah | 709/229 |
| 2005/0132020 A1* | 6/2005 | Gorbet et al. | 709/217 |
| 2005/0132207 A1* | 6/2005 | Mourad | 713/189 |
| 2005/0136388 A1* | 6/2005 | de Saint-Aignan et al. | 434/350 |
| 2005/0203931 A1* | 9/2005 | Pingree et al. | 707/100 |
| 2006/0068368 A1* | 3/2006 | Mohler et al. | 434/362 |
| 2006/0099564 A1* | 5/2006 | Bohle et al. | 434/350 |
| 2006/0235813 A1* | 10/2006 | Chakraborty | 706/20 |
| 2007/0100882 A1* | 5/2007 | Hochwarth et al. | 707/104.1 |
| 2007/0101331 A1* | 5/2007 | Krebs | 718/101 |
| 2007/0143751 A1* | 6/2007 | Butler et al. | 717/174 |
| 2007/0196803 A1* | 8/2007 | Goodrich | 434/323 |
| 2008/0160491 A1* | 7/2008 | Allen et al. | 434/362 |
| 2008/0213741 A1* | 9/2008 | Redd et al. | 434/365 |
| 2009/0197234 A1* | 8/2009 | Creamer et al. | 434/350 |
| 2009/0197238 A1* | 8/2009 | Moffatt et al. | 434/430 |
| 2010/0250653 A1* | 9/2010 | Hudgeons et al. | 709/203 |
| 2010/0285781 A1* | 11/2010 | Dai et al. | 455/414.1 |
| 2012/0052475 A1* | 3/2012 | Carman | 434/350 |

FOREIGN PATENT DOCUMENTS

WO    WO 2005055174 A1 *  6/2005

OTHER PUBLICATIONS

International Search Report for Int'l Patent App. No. PCT/US2011/39966 dated Oct. 3, 2011 ( 8 pgs).

* cited by examiner

*Primary Examiner* — Venkat Perungavoor
*Assistant Examiner* — Christopher Ruprecht
(74) *Attorney, Agent, or Firm* — Rick Boyd; Paul Heynssens; Ater Wynne LLP

(57) ABSTRACT

A system and method are described that provide nearly universal and simple access by learners everywhere to content developed by authors everywhere to produce an e-learning marketplace. Content is stored and updated centrally and current content is distributed to local content servers via a content delivery network (CDN). A proprietary server enables interfaces and a loadable seed to a user server connected with one or more learning management systems (LMSs). Training managers subscribe to content, the author obtains payment, and the learners 'attend' one or more courses, the completion status and grade of which are reportable to the one or more LMSs. Security is provided as is interaction among various users of the invented e-learning system and method.

16 Claims, 8 Drawing Sheets

Author uploads course and metadata to OPENSESAME™

Author uploads course and metadata to OPENSESAME™

Training Manager purchases course and downloads SESAMESEED to install in his/her LMS. Author is paid for purchase.

Learner launches course from his/her LMS

Training Manager or Learner rates course.

Information exchange and browser detail

SESAMESEED SCORM Detail

SESAMESEED AICC Detail

OPENSESAME™ Business Model

OPEN AND INTERACTIVE E-LEARNING SYSTEM AND METHOD

RELATED APPLICATIONS

This application claims the benefit of priority to U.S. Provisional Patent Application No. 61/397,797 filed on Jun. 15, 2010 and entitled OPEN AND INTERACTIVE E-LEARNING SYSTEM AND METHOD, the entire contents and disclosure of which are hereby incorporated herein by this reference.

FIELD OF THE INVENTION

The invention relates generally to the field of on-line learning systems. More particularly, the invention relates to on-line learning systems in which content is readily publishable by a teacher and is readily accessible by a student via platform-independent means.

BACKGROUND OF THE INVENTION

Learning management systems (LMSs) conventionally are closed learning systems by which a corporation makes teaching content available on-line to employees who are authorized to subscribe thereto under management mandate or permission. Typically, such teaching content is stored in complex forms on central servers, and access thereto most often requires the involvement of an LMS's information technology (IT) department to decode and debug. Thus each attempted e-learning content access requires a customized effort with expensive and expert involvement. Such access tends to be one-way rather than interactive, i.e. individual students each review the teaching content in its 'canned' form without any ability to interact with the author or an instructor or peers, and without any ability to critique, update, question, or otherwise affect the teaching content. Even the author or instructor of the on-line content in accordance with traditional systems does not have any update, revision, or augmentation control over the content after it is data-based (e.g., stored) in a central server that forms part of the LMS. Thus, loss of access by a learner or student, and loss of control by an author or instructor of courseware, characterizes the conventional LMS e-teaching/e-learning model.

Content delivery networks (CDNs) conventionally provide application-specific on-line content, e.g. music via ITUNES™ (ITUNES is a trademark owned by Apple Computer, Inc.). However, those with skill in the art will appreciate that downloading and playing music from ITUNES is unidirectional and non-interactive, in that a track is simply downloaded, played, and listened to, requiring and enabling no response or feedback or other reverse communication from the listener back to the source of the downloaded content. Those with skill in the art also will appreciate that worldwide musical digital content formats (e.g., MP3, etc.) provide universal formatting standards for such music downloads, thus simplifying the players that are designed for musical download systems.

The Sharable Content Object Reference Model (SCORM) and Aviation Industry Computer-Based Training Committee (AICC) standards claim to offer such an interoperable e-learning content standard. Unfortunately, in practice they do not guarantee interoperability. Newer standards are periodically released that require LMS systems to also be updated. Moreover, content that is claimed to conform to the standards may not be deliverable on every standards-compliant LMS due to differences in LMS system programmers' or content authors' interpretation of the standard or programming errors that only arise when a specific SCORM or AICC package is delivered through a specific LMS. Further, once most SCORM or AICC courses are loaded into an LMS they must be manually updated, which makes it generally impossible for a course author or content provider to control or track content once it has been deployed. Those with skill in the art will appreciate that vendors of some products, for example SKILLSOFT™ (SKILLSOFT is a trademark owned by Skillsoft Ireland Limited), use AICC to centrally host and manage content. Nevertheless, they do not provide for secure but distributable central storage of a broad range of content. Moreover, SKILLSOFT may require a technical integration with the IT team, which can be costly and complex.

BRIEF DESCRIPTION OF THE DRAWINGS

FIG. 2 highlights how a training manager would use the invented system; FIG. 3 highlights how a learner would use the invented system; and FIG. 4 illustrates the interaction and feedback mechanisms by which a learner or training manager provide course feedback to the author or other prospective buyers, e.g. by rating a course, collaborating in a discussion of the course, participating in a study group, etc.

DETAILED DESCRIPTION OF THE PREFERRED EMBODIMENTS

Figure 1:
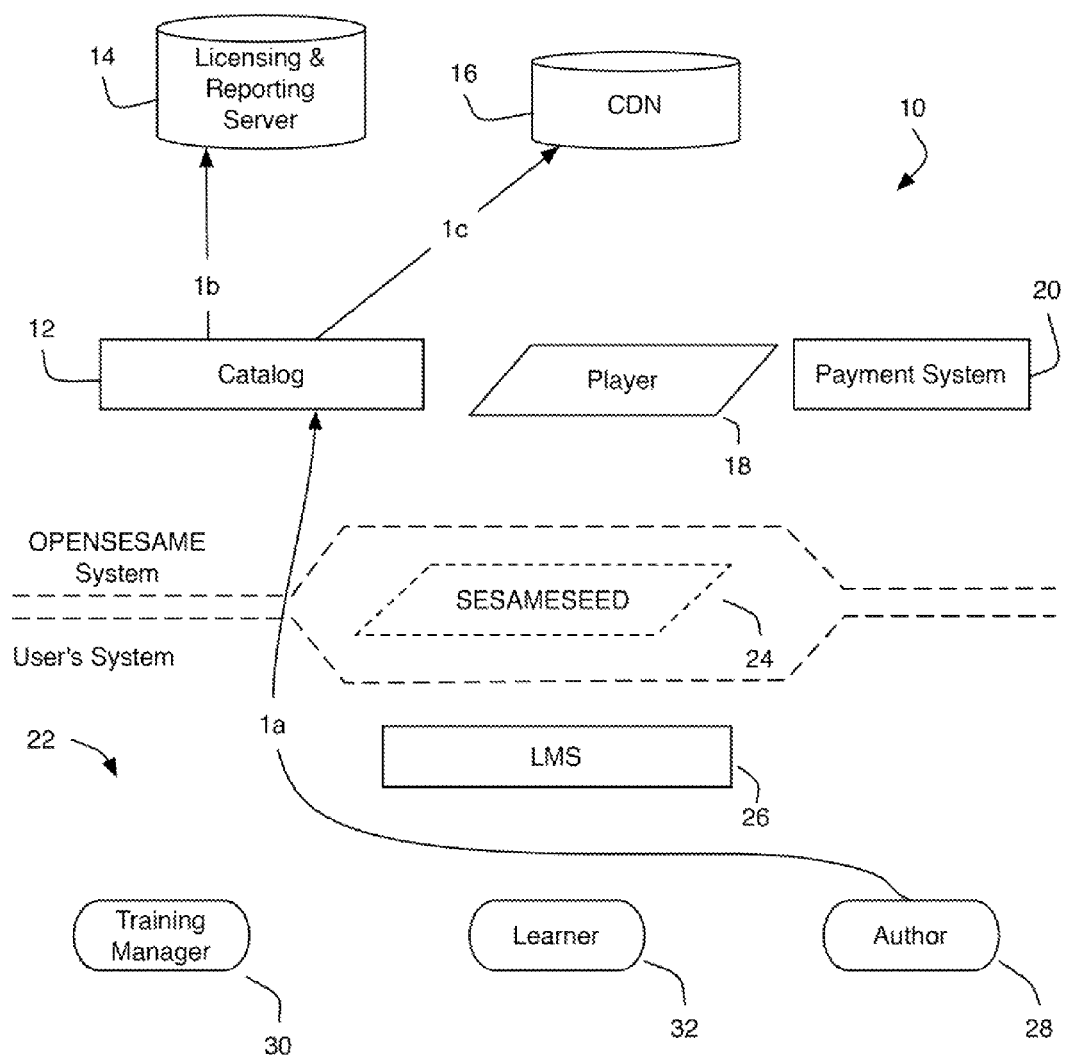
FIGS. 1, 2, 3, and 4 collectively illustrate block diagrams of the system architecture and highlight various uses that characterize the system and method, according to an embodiment of the invention. More particularly, FIG. 1 highlights how an author would use the invented system.

The invented system and method solve the above-identified problems by, for example, abstracting the actual courseware (e.g., e-learning course content) from the LMS via a proxy SCORM package (called 'SESAMESEED'). In accordance with one embodiment of the invention, the SESAMESEED proxy is loaded into an LMS and communicates with the system (called 'OPENSESAME') to enforce access control, to provide access to the latest version(s) of the content (or current version, if desired), to provide status updates to the LMS system, and to relieve the LMS system of the burden of hosting and playing the content (which may be large files and implement a different SCORM or AICC version, or may even be incompatible with the LMS due to inconsistent or incorrect implementation of such a 'standard'). As used herein, a 'SCORM package' generally refers to a set of coded instructions configured when executed to perform a designated task or set of tasks within a SCORM-compliant environment, system, device, etc. Examples include the SESAMESEED proxy, content for a course (e.g., 'courseware'), etc.

An ordinarily skilled artisan will appreciate that the present invention is not intended to be limited to the use of any particular standard content wrapper or definition. Thus, references herein to a SCORM implementation are simply for purposes of illustration and not restriction. Those with skill will appreciate that the use of SCORM, AICC or any other suitable standard—including a future proprietary or open source standard that might gain traction and might become widely accepted—is contemplated as being within the spirit and scope of the invention.

OPENSESAME™ and SESAMESEED™ are trademarks owned by the assignee of the present invention, namely Blue Tech LLC, all rights reserved world-wide.

FIGS. 1-4 collectively illustrate the architecture of invented system 10 and highlight four different use models or use phases of the invented system including data and control, flow and interaction. The invented OPENSESAME system 10 may be seen to include an OPENSESAME catalog 12 (e.g., e-learning course catalog), an OPENSESAME licensing and reporting (licensing/reporting) server 14 (e.g., a digital rights management (DRM) server), a content delivery network (CDN) 16, an OPENSESAME player 18 (e.g., content player), and a payment system 20. The invented user system 22 may be seen to further include a SESAMESEED proxy 24, an LMS 26, an author 28, a training manager 30, and a learner 32. The OPENSESAME catalog 12 provides the interface for uploading of content from author 28, and for browsing, purchasing, rating and obtaining a copy of SESAMESEED proxy 24 by training manager 30 for loading into LMS 26.

Those with skill in the art will appreciate that SESAMESEED proxy 24 resides and executes typically in invented user system 22, but actually forms an important part of invented OPENSESAME system 10 in accordance with one embodiment of the invention. This unique system architecture by which a non-OPENSESAME-server-resident component of OPENSESAME system 10 resides and executes on user system 22 is indicated in FIGS. 1-4 by two crooked dashed lines.

When author 28 uploads content, he or she is able to add metadata to the course (e.g., to the course description, etc.) to assist one or more training managers 30 in browsing and identifying relevant courseware. Author 28 also provides a so-called "zip" (compressed) file containing SCORM- or AICC-compliant courseware. Files in the course package (e.g. a 'SCORM package' when configured for SCORM compliance) are processed to allow them to be delivered within the SCORM runtime via one or more CDNs. A current copy of the courseware is then placed on the one or more CDNs 16 where it can be accessed by one or more authorized learners 32 via their customer LMS 26 and the SCORM or AICC runtime provided by OPENSESAME player 18. As used herein, a "Learner" (or learner) is typically a student or employee, etc., who has been assigned an e-learning activity by a training manager or elects to begin an e-learning activity made available through an LMS. The learner generally interacts with the invention through their web browser, into which may be loaded files from an LMS and/or the invented OpenSesame system. As used herein, a "user" can be either of a learner or a training manager, and is typically a customer for e-learning courses and/or content within the invented system and method.

When a training manager 30 purchases a course, a license record is inserted into licensing and reporting (licensing/reporting) server 14. The one or more learners 32 can then simply launch the course from one or more corresponding LMSs 26, and interact with the course content. "Launching" an e-learning course typically refers herein to the learner's interaction with a web browser that begins the delivery of the course. This is typically done by clicking a link in the LMS system that identifies the specific course being delivered.

A suitable LMS can include, for example, SUMTOTAL (from SumTotal Systems), BLACKBOARD (from BlackBoard Inc.) and CORNERSTONE LMS (from CornerStone On Demand). According to several exemplary embodiments, suitable players of SCORM content may include but are not limited to RUSTICI SCORMENGINE (from Rustici Software), ICODEON SCORM Player (from Icodeon Ltd.), or other SCORM players developed for and/or provided for use with a commercial LMS system such as those listed above.

Conventional techniques for delivering (e.g., playing, displaying, etc.) content from a CDN require the player and the content to be served from the same domain. Some CDNs permit this, but it is expensive and nontrivial to configure. In order to play SCORM content, for example, in this fashion, the browser's security model must be taken into account. Specifically, the web browser does not allow script calls between pages on different domains, so the invented OPENSESAME system and method process the content, injecting a script that instructs the web page to set its own domain indicator (document.domain) to the same domain that the player will be served from, before providing the content to (and/or storing the content at) the CDN. An embodiment of this novel solution involves the content and player being served from domains that share a common root domain, e.g. content.opensesame.com and cdn.content.opensesame.com. Thus, the invention solves problems and avoids restrictions and complexities of conventional CDN-based content-playing techniques. In at least another embodiment, a CDN aggregates traffic under a single domain using a reverse-proxy server configuration.

The licensing/reporting server 14 provides authorization and licensing services, and aggregates status reports regarding the learners 32 progress in the course. licensing/reporting server 14 also tracks content access for the purpose of restricting access to authorized users such as author 28, training manager 30, and/or learner 32. When an access request is made, licensing/reporting server 14 records the request, logging which user and license (e.g., a key used to look up LMS customer, course, and purchase information) seeks access. Licensing/reporting server 14 then compares those values to its license store. If the requesting user is permitted according to a favorable comparison, then licensing/reporting server 14 returns in its response a location designator, for example a uniform resource locator (URL), and/or other parameters necessary for the SESAMESEED proxy 24 to make a request to play content on the OPENSESAME player 18. For example, the proxy can already include the URLs designating one or more players, and the response indicates parameters that the proxy can use to load an appropriate (e.g., selected, content-compatible, etc.) player for the e-learning course and/or content.

According to a typical embodiment, "playing" e-learning course content refers to supplying learner-perceivable course content files (html, images, video) and standard runtime (SCORM, AICC, future standard to emerge) functions to a learner's browser and tracking the learner's progress through the course to the satisfaction of the completion criteria defined by the course author, for example, when packaging the content. If access is denied, a signal is sent to the user's browser to display a warning message on the user device (e.g. a desktop, laptop or notebook computer, an IPAD™, a personal digital assistant (PDA), a smart phone, etc.), rather than playing, delivering or otherwise providing access to the requested content.

The CDN 16 is a storage and retrieval mechanism for the courseware provided by one or more authors 28. A suitable CDN can be nearly any commercial or proprietary content delivery network. Examples of commercial CDNs include but are not limited to AKAMAI (from Akamai Technologies), EDGECAST (from EdgeCast Networks, Inc.) and COTENDO (from Contendo Inc.). Proprietary CDNs can include those developed and/or otherwise established for access and use primarily or solely within, for example, an educational institution or system, a corporate entity (e.g., company), a government agency, etc.

In accordance with one embodiment of the invention, the OPENSESAME system 10 employs standard security schemes provided by CDNs including time-based access, signing/hashing of URL parameters with a shared key, etc.

The OPENSESAME player 18 provides standardized, e.g. SCORM and/or AICC, runtime support for playing content provided to the OPENSESAME system 10 by content author 28. The OPENSESAME player 18 also provides status updates to the licensing/reporting server 14 and the SESAMESEED proxy 22, which in turn provides status updates to the LMS 26. It is this mechanism that enables the abstraction of the content runtime ('runtime abstraction') from the LMS runtime. An ordinarily skilled artisan will appreciate that the OPENSESAME player 18 is embodied as either or both of a server system and a set of instructions providing runtime functionality resident in the learner's web browser.

The SESAMESEED proxy 22 is a standards-based, e.g. SCORM or AICC, module representing purchased content (e.g., a course) provided on-demand to a user (e.g., training manager 30) for loading into his or her LMS 26. The SESAMESEED proxy is initially stored on a tangible computing-device-readable medium at the network-side, typically at the licensing/reporting server 14, in a template form that does not yet include instructions relating to a specific instance of content. However, once a course is purchased by a user (e.g., a training manager, etc.), a SESAMESEED proxy will be configured to include instructions that relate to a specific instance of content, for execution by a client-side computing device. A SESAMESEED proxy so configured typically remains stored at the server-side until being conveyed to a user as described below. Those with skill in the art will appreciate that loading the proxy need happen once only per purchased license.

Reference herein to a "specific instance of content" generally means that the instructions in the SESAMESEED proxy allow the proxy to be used only within the scope of the specifically purchased license stored at the licensing/reporting server 14. The license scope may define access to one or more specific courses or specific modules of a course, to a specific user or limited number of users, to a specific number of times played/accessed, or to another limitation or combination of limitations. For example, a specific instance of content can include instructions enabling access to a particular course by all employees in a corporation. Conversely, a specific instance of content can include access to a specified grouping (e.g., list) of courses by only one or more specified persons or groups of persons. Therefore, an ordinarily skilled artisan will recognize that while the scope of a specific instance of content is limited by the instructions in the SESAMESEED proxy, such instructions can be configured according to nearly infinite combinations each representing a separate specific instance of content.

An ordinarily skilled artisan will also appreciate that the training manager can simply update the license (e.g., by purchasing additional seats) on the server to permit more users ('seats') to access the course. Additionally, the training manager may load the SESAMESEED proxy 22 into one or more other LMS systems and access the same seats purchased. These and other approaches are contemplated as being within the spirit and scope of the invention.

From the perspective of the LMS 26, SESAMESEED proxy 24 is a SCORM or AICC course, but those with skill will appreciate that the SESAMESEED proxy does not contain the actual content. Instead, in accordance with one embodiment of the invention, the SESAMESEED proxy 24 contains a licensing identifier that, along with the user and course identifier provided by LMS 26, are passed to licensing/reporting server 14 by the SESAMESEED proxy when learner 32 acts to launch an OPENSESAME course (see above detailed description of licensing/reporting server 14 for description of the authorization process).

If the authorization is successful, the SESAMESEED proxy 24 prompts the user's browser to load the provided URL to the OPENSESAME player 18, the player prompts the user's browser to load the URL to the content on the CDN, and the user interacts with the course content via the user's browser. The SESAMESEED proxy 24 remains resident in the browser and acts as a proxy, relaying status changes from the player 18 back to the customer LMS 26. In another embodiment, status changes are relayed from the player 18 through the SESAMESEED proxy 24 and back to the customer LMS 26. In one embodiment, status changes are sent from the player 18 to the LMS system directly. In one embodiment of the invention, the SESAMESEED proxy 24 relays the following SCORM runtime values: cmi.core.lesson_status, cmi.core.score.raw, cmi.core.session_time. Those of ordinary skill in the art will recognize that the values passed back to the customer LMS 26 will vary depending upon the specific standard that the SESAMESEED proxy 24 implements.

In addition, the user can rate the course, and the rating is passed through the OPENSESAME player 18 to the licensing/reporting server 14 where it can be accessed by catalog 12 and provided, in aggregate, to prospective customers as well as to the author of the course.

Those with skill in the art will appreciate that the numbered and lettered reference designators described below by reference to FIGS. 1-7 are intended to be illustrative and not limiting. Specifically, the numbered and lettered reference designators do not necessarily indicate chronology or order, and should not be so interpreted as a limitation of the invention, the scope of which will be determined by the claims.

Additionally, as diagrammatically represented in FIGS. 1-4, the invented system and method operates within each of (and across) a 'client-side' and a 'network-side.' Generally, although not exclusively, "client-side" refers to the devices and/or operations of a training manager and/or a learner, typically including an LMS. From a viewpoint of a provider of the invented system, the client-side represents the customer for e-learning courses.

Conversely, the network-side represents the provider(s) of e-learning courses and/or systems for accessing and interacting with such courses and/or content. The network-side in an exemplary but non-limiting embodiment includes, for example, a licensing/reporting server, a content player, a catalog, and a CDN. A payment system, when present, is also typically represented on the network side.

The network-side and client-side components of the invented system and method are operably coupled and exchange information across a data-transfer network in a typical but not exclusive embodiment. Therefore, one or more of the client-side components can be remotely located from one or more of the network-side components, although a local area network can also be used, and the one or more client-side components can be located locally relative to the one or more network-side components. Therefore, an ordinarily skilled artisan will recognize that the physical location of the various system components does not determine whether such components are considered client-side or network-side.

Unique to the invented system, the SESAMESEED proxy bridges the network-side and the client-side, originating and interacting with the network-side, but being stored and executed during operation at the client-side. It is this dual nature of the SESAMESEED proxy that enables several of the enhanced capabilities of the invented system and method.

Those with skill in the art will appreciate that various "users" (broadly defined and also referred to alternatively herein as "customers") include authors/instructors, training managers, and/or learners/students who make various uses of the system capabilities resulting in various interactions, data and control paths and flows, etc., as described below by reference to FIGS. 1-4. Because such users have different goals and roles in the use of the invented system, they tend to have different tools at their disposal, as will be described by reference below to their respective user devices.

Briefly previewing, those with skill will appreciate that the embodiments depicted in FIGS. 1-4 are identical in terms of the identically numbered functional blocks and users they feature, but that FIGS. 1-4 are different in terms of the actions performed by the functional blocks and users featured. Thus, those with skill in the art will appreciate that different interaction lines representing actions and information passing between and among the various blocks and users are represented in four different use models (or use phases), in accordance with the invented system and method. This will become clear from the following description. Note: the arrows in FIGS. 1-6 indicate conveyance of a request, a response, instructions, content, or another type of information, for example, from one block or user to another. The direction of each arrow indicates the direction of each conveyance, from the originating block or user to the receiving block or user. Likewise, double-ended arrows indicate a bi-directional conveyance, such as in a request and response interaction, an exchange of information during operation of the invented method, or some other similarly bi-directional interaction. In FIGS. 1-4, the SESAMESEED is positioned in the center of the document to illustrate its role as a bridge between the OPENSESAME and customer systems. As is described below, the actual location of the SESAMESEED changes during the course of at least one usage scenario, from within the licensing/reporting server 14 to the customer LMS 26 and/or the learner's device 32.

FIG. 1 illustrates an author's use of invented system 10. The several operations of the invented method are scripted below by reference to their numbered and lettered reference designators. In FIG. 1, the SESAMESEED is represented with dashed borders to indicate that it initially exists as a proxy template residing at the licensing/reporting server 14, rather than as a fully configured and functional proxy. The SESAMESEED proxy template generally includes all information and/or instructions necessary for it to function within the invented system as intended, except that it does not yet include information and/or instructions corresponding to a specific license (e.g., to a particular course or other specific instance of content) purchased by a user.

At 1a, an author provides a course (e.g., as a zip file) and metadata to the OPENSESAME catalog.

At 1b, the OPENSESAME catalog stores license information in the licensing/reporting server.

At 1c, the OPENSESAME catalog processes the content and stores it on one or more CDNs.

Those with skill in the art will appreciate that, within the spirit and scope of the invention, author 28 also can update his or her content stored at a central location (e.g. via CDN 16), and such updated content becomes immediately available on-line to the other users including training manager 30 and learner 32 by a 'push' from the CDN to its distributed content servers, or by a 'pull' by distributed content servers from the content origin. Thus, those with skill also will appreciate that author 28 need not contact or otherwise communicate with anyone or everyone who has already loaded the content into their one or more LMSs 26 to provide the updated content or to notify them regarding the updates, although such notifications can be optionally provided. Therefore, e-learning content is not only accessible to all, but e-learning content can also be very simply updated once or more to maintain its perpetual currency.

Figure 2:
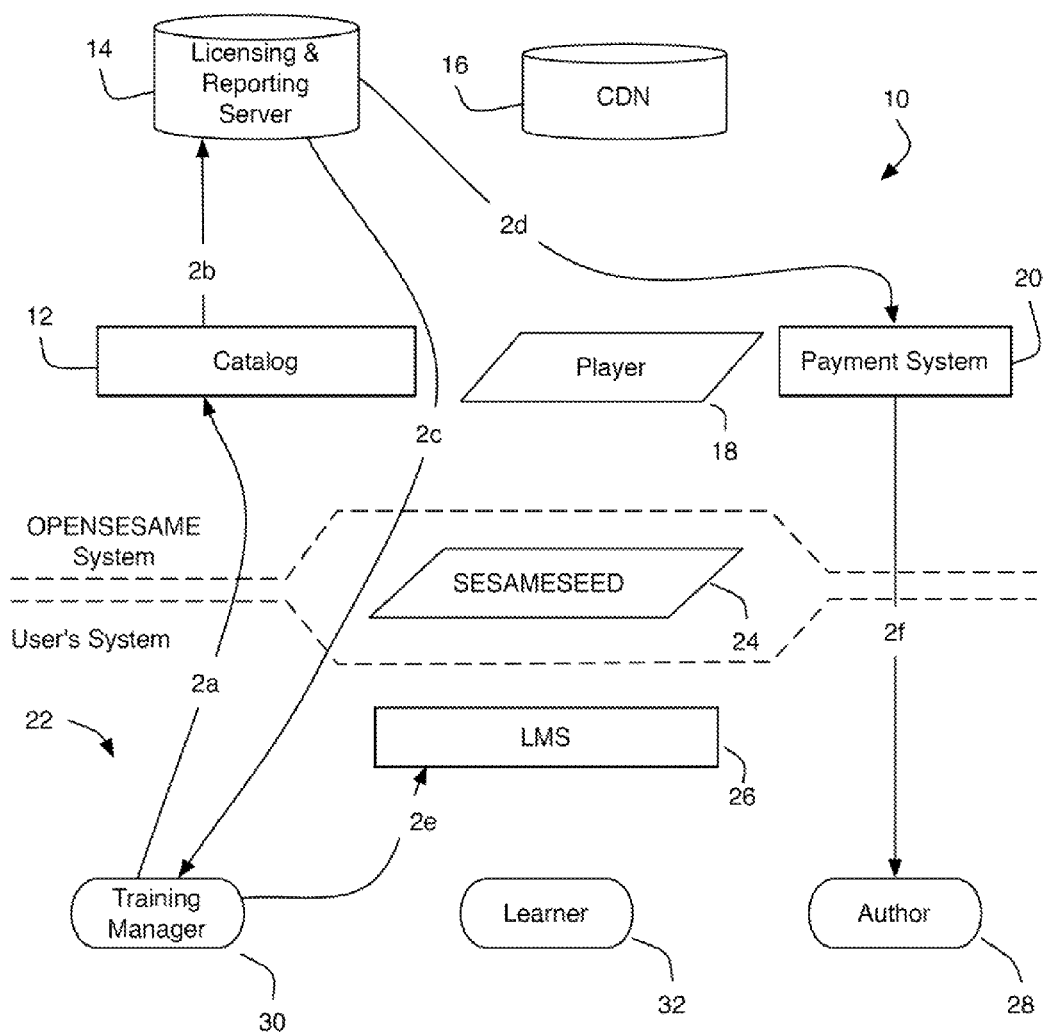

FIG. 2 illustrates a training manager's use of invented system 10. In this usage scenario, license identifiers are added (2b) to the SESAMESEED proxy template, and the resulting SESAMESEED proxy is then delivered to the training manager's device (2c) and is finally uploaded to the LMS (2e). Therefore, the SESAMESEED is represented with solid borders indicating that it exists as a functional entity within the client-side as depicted in FIG. 2. For descriptive convenience, the SESAMESEED proxy is interchangeably referred to herein as simply the SESAMESEED.

At 2a, a customer (e.g., a training manager) chooses a course (or other content) to purchase and provides payment information.

At 2b, the OPENSESAME catalog system requests that the licensing/reporting server create a license for the training manager 30, which is then stored at the licensing/reporting server.

At 2c, the training manager sends a request to the licensing/reporting server which in response provides to the training manager a SESAMESEED proxy corresponding to the purchase.

At 2d, the licensing/reporting server makes a payment request to the payment system (e.g., to pay the author an agreed upon amount that is due from the purchase of the course/content). Those with skill in the art will appreciate that, in practice, the OPENSESAME system may hold the payment for a period of time before paying the author, to ensure against charge-backs, etc.

At 2e, the training manager loads the SESAMESEED proxy into his or her LMS.

At 2f, the payment system delivers payment to the author.

Those with skill in the art will appreciate that, in accordance with the invention, the training manager 30 can additionally suggest a course, or suggest a topic, or can request customization from a specific author, etc. All such augmentations to the invented system and method are contemplated as being within the spirit and scope of the invention.

Figure 3:
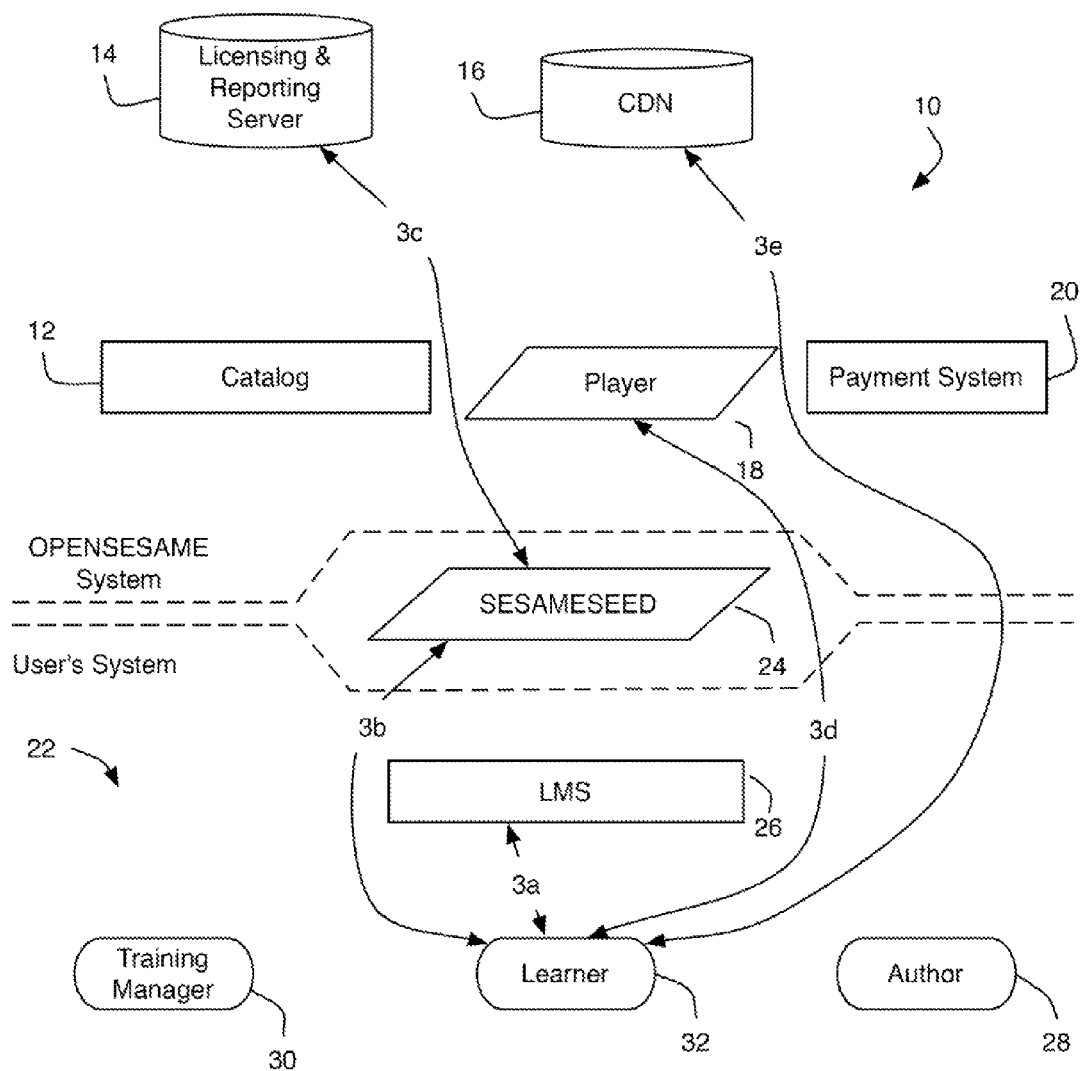

FIG. 3 illustrates a learner's (or student's) use of invented system 10. In FIG. 3, the SESAMESEED is represented with solid borders indicating that it exists as a functional entity. In the usage scenario of FIG. 3, the SESAMESEED exists both in the LMS (at 3a) and in the learner's browser (3b), acting as the link between the invented System 10, the learner 32, and the LMS 26.

At 3a, the learner requests a course from his or her LMS by clicking on a link or otherwise acting to launch a course or learning object. The LMS responds with the location of the course.

At 3*b*, the learner requests and the learner's browser loads the course, which in accordance with one embodiment of the invention is actually a SESAMESEED proxy provided from the LMS.

At 3*c*, the SESAMESEED proxy makes a licensing request to the licensing/reporting server, which then returns a script containing a player URL, instructions in the form of JAVASCRIPT™ (JAVASCRIPT is a trademark owned by Oracle Corporation), or another machine-readable code and associated parameters. Alternatively, the licensing/reporting server returns a signal indicating that access is denied. Those with skill in the art will recognize that by delivering instructions in the form of code from the server to the SESAMESEED proxy, rather than embedding them directly into the SESAMESEED proxy, allows for changes to be made to the code without the training manager having to re-upload the SESAMESEED proxy into their LMS after each change.

At 3*d*, if authorization succeeds (i.e. the user is allowed to launch the course), then the SESAMESEED proxy instructs the learner's web browser to load the player URL. Once loaded, the player 18 instructs the learner's browser to load from the CDN the content corresponding to the course. The URLs to the content are constructed by the OPENSESAME player to be good only for this specific launch of the content. According to one embodiment of the invention, the system will not allow access if the user tries to use the same URL to later access the content.

At 3*e*, the learner's browser requests content from the CDN, and the content is loaded from the CDN into the user's browser.

Figure 5:
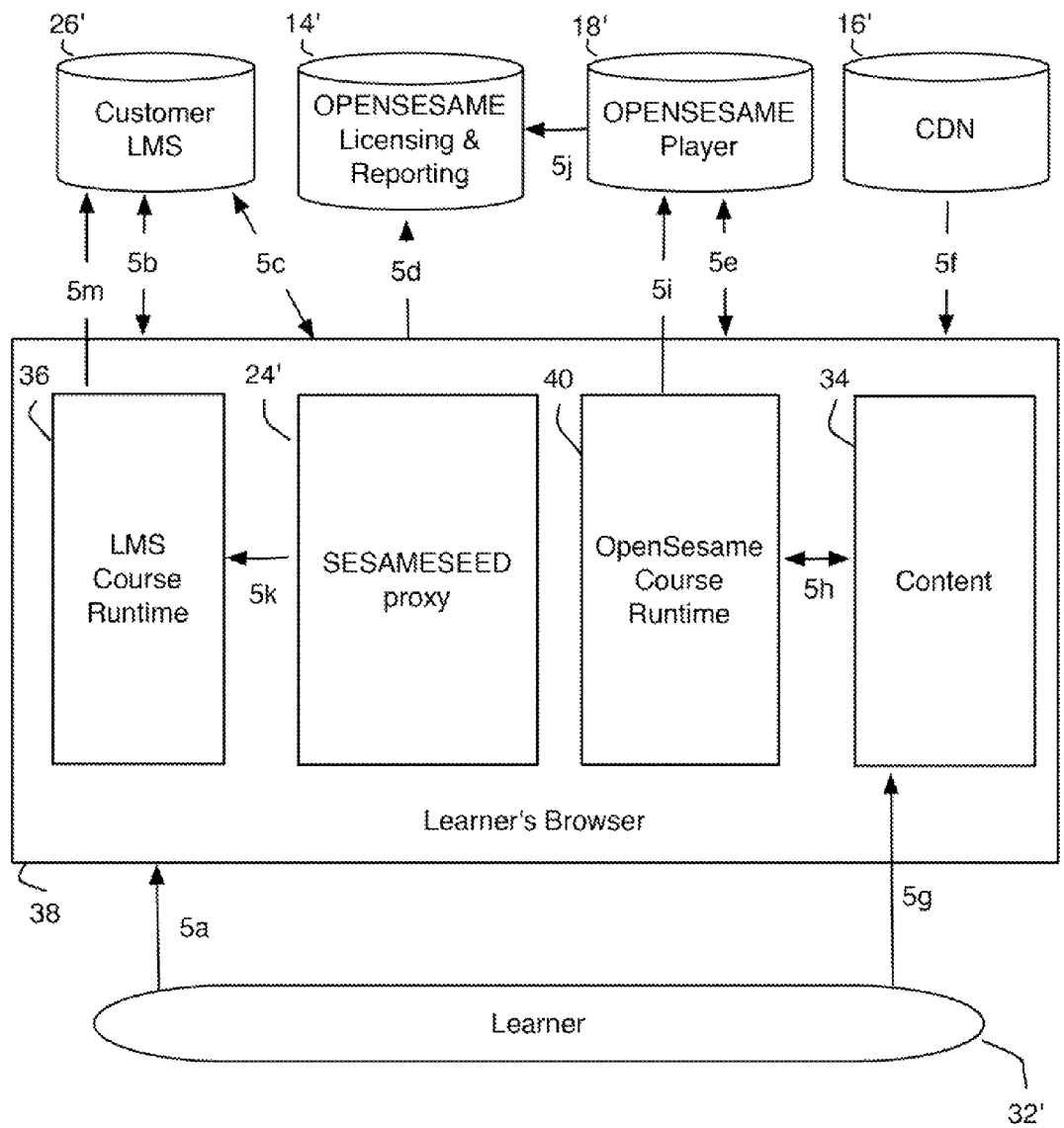
FIG. 5 illustrates an information exchange model by which the system and method operate, in accordance with an embodiment of the invention.

FIG. 5 further depicts an alternative perspective on the LMS, the SESAMESEED proxy, the layering, and the content, as they relate to the learner's web browser and as is also described below.

Those with skill in the art will appreciate that, in accordance with one embodiment of the invention, the learner additionally or alternatively can participate in social features of a course (e.g. collaborating on-line with a fellow learner or tutor, 'attending' an online study group session, blogging about a course and its impact on the learning experience, etc.). Those with skill also will appreciate that such interactive learning tends to reinforce and thus to enrich the learning experience. It will also be understood that such interactions may be subject to restrictions from particular LMSs to prevent cheating, plagiarism, etc.

FIG. 3 illustrates the flow of content requests as they relate to the user only, and intentionally omits further communication between SESAMESEED proxy 22 and licensing/reporting server 14. FIG. 3 also intentionally omits depicting communication between the OPENSESAME player 18, content, and the licensing/reporting server (which enables tracking of a user's status in the course). Such omissions are made in the interest of drawing clarity alone, and no limitations should be inferred from the omissions.

Figure 4:
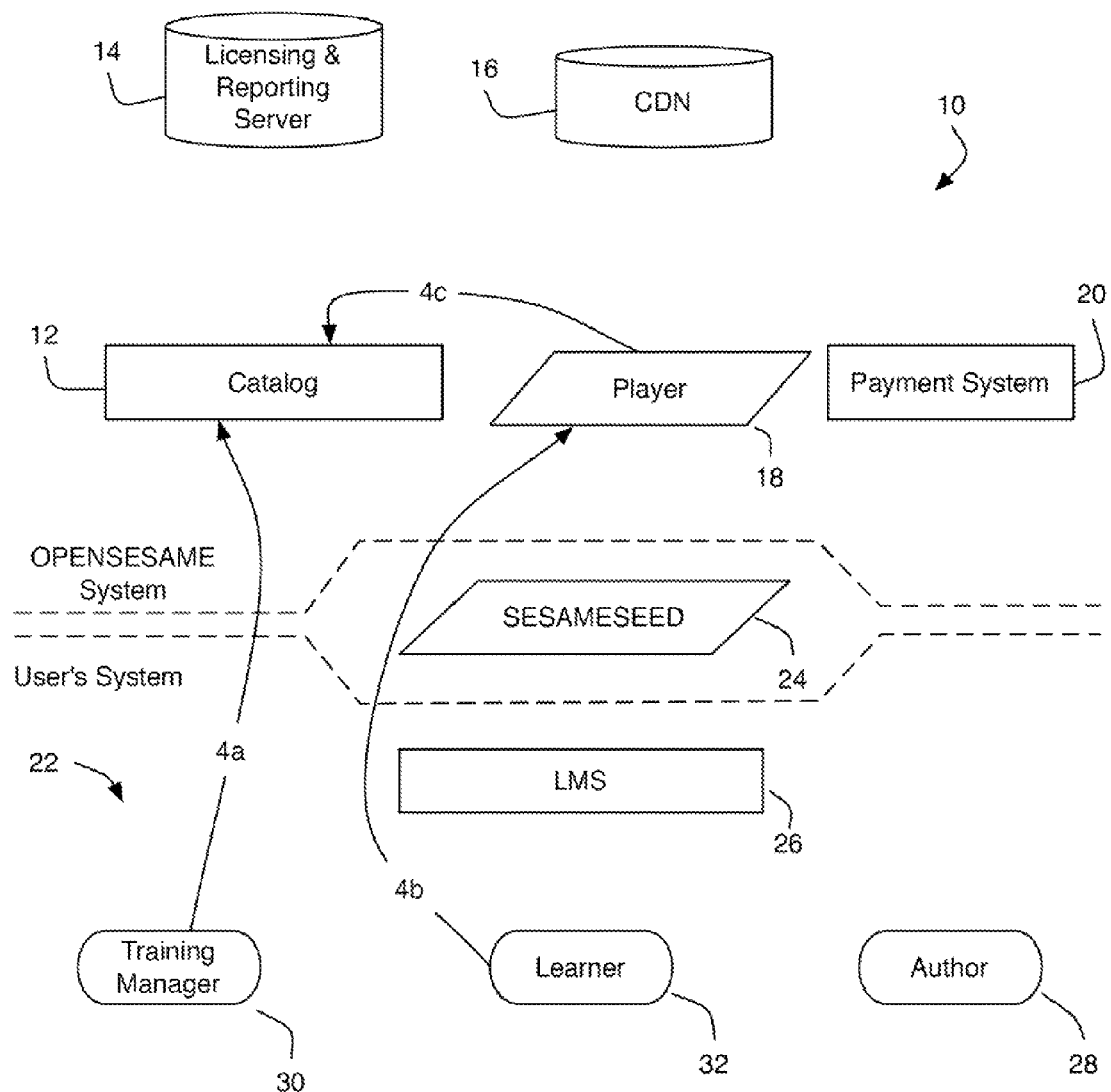

FIG. 4 illustrates a learner's or training manager's use of invented system 10 to rate and review courses.

At 4*a*, the training manager provides a rating or review of a course through the interface of the catalog. In accordance with one embodiment of the invention, this is a direct contact between the training manager and the catalog.

At 4*b*, the learner provides a rating through their web browser to the OPENSESAME player.

At 4*c*, the OPENSESAME player stores the rating information in the OPEN SESAME catalog.

FIG. 5 is a block diagram depicting an information exchange model of the OPENSESAME system shown in FIGS. 1-4. Those with skill in the art will appreciate that FIG. 5 illustrates the invention as it is loaded into the user's web browser from the LMS and OPENSESAME system, and calls out specific communication protocols and methods. Identical elements in the embodiment of FIG. 5 are designated identically as in the embodiments of FIGS. 1-4, and like elements are designated identically except that they are represented as primed numbers, e.g. 18'. The learner's browser 38 is shown separately from the learner 32' in FIG. 5 for purposes of explanation only. An ordinarily skilled artisan will recognize that the learner's browser typically resides on the learner's computing device, as represented in one or more of the other figures as learner 32.

FIG. 5 may be seen further to include a content layer 34, an LMS course runtime 36, and a browser 38, all of which are believed to be largely self-explanatory. According to an embodiment, content layer 34 contains the e-learning content corresponding to the purchase; LMS course runtime 36 represents the LMS's built-in SCORM or AICC content player as resident in the user's browser; browser 38 is a standard browser (e.g., MICROSOFT INTERNET EXPLORER, MOZILLA FIREFOX, APPLE SAFARI, etc.) currently invoked on the user's device; and OPENSESAME course runtime 40 is the SCORM or AICC runtime resident in the user's browser. "In the browser" generally indicates that a set of instructions (e.g. a functional module) has been received from a remote or local data storage device, as in the conventional example of a web page retrieved from an internet source, and made available for user interaction via the browser.

Those with skill will appreciate that the communication steps indicated and explained below may in fact occur repeatedly, simultaneously, synchronously, or asynchronously depending upon the learner's input, how the courseware is authored, and which learning standard the courseware or SESAMESEED proxy implements.

In FIG. 5, the SESAMESEED resides in the user's browser but is delivered there by the customer LMS 26.

At 5*a*, a learner 32' instructs his or her web browser (by clicking or otherwise following an anchor tag as in the case of a screen-reader or mobile or other device) to request course pages from his or her customer LMS 26' via a hypertext transfer protocol (HTTP), and the browser conveys the request to the LMS. Course pages will typically include a launch URL that the LMS uses to look up and instruct the browser to request course content.

At 5*b*, as instructed in 5*a*, the learner's browser requests the LMS course runtime 36 from the customer LMS 26' and the LMS course runtime is loaded into the browser.

At 5*c*, the LMS course runtime 36 instructs the learner's browser 38 to requests a SESAMESEED proxy 24 from the customer LMS, via HTTP.

At 5*d*, the SESAMESEED proxy 24' instructs the learner's browser to request authorization from the OPENSESAME licensing/reporting server 14' for learner 32' to access the course specified in the proxy. If the request is successful, the response from the licensing/reporting server will include a location designator for a content player for the selected course/content.

At 5*e*, the SESAMESEED proxy 24' instructs the learner's browser 38 to load the OPENSESAME course runtime 40 from the OPENSESAME player 18', and the OPENSESAME course runtime 40 is loaded into the learner's browser 38. This request is in the form of an HTTP request parameterized with a query string.

At 5*f*, the OPENSESAME course runtime instructs the learner's browser to load content from the CDN, and the content is loaded into the learner's browser 38 from the CDN 16' for viewing/learning/interacting by the learner.

At 5g, the learner 32' interacts with content 34 in their browser 38 via one or more output devices (e.g., a visual display device, a sound-generating device, a haptic-interface device, etc.) that are operably coupled with the learner's device 32' and are configured to perceivably present the content to the learner. The interaction can include, but is not limited to, viewing, listening, or otherwise perceiving multimedia content, taking a training course and/or example, answering questions presented to the learner, etc.

At 5h, the OPENSESAME course runtime 40 and content 34 communicate with each other via HTTP SCORM or AICC runtime requests, for example. This communication is bidirectional according to relevant standards, and accomplishes tasks necessary to present content to the user, resume where the user left off (bookmarking), and report a completion (full, partial, or failure) status to the player (refer to 5j for completion status storage and aggregation).

At 5i, the OPENSESAME course runtime 40 sends status updates to the OPENSESAME player 18'.

At 5j, the OPENSESAME player 18' reports user completion status, scores, and/or ratings to the OPENSESAME licensing/reporting server 14', which may then report and/or aggregate the information provided by the OPENSESAME player 18'. At 5k, the SESAMESEED proxy 24' sends status messages relating to course completion, progress, or score, for example, to the LMS course runtime 36. At 5m, the LMS course runtime 36 further conveys the status messages to the customer LMS 26'.

Figure 6:
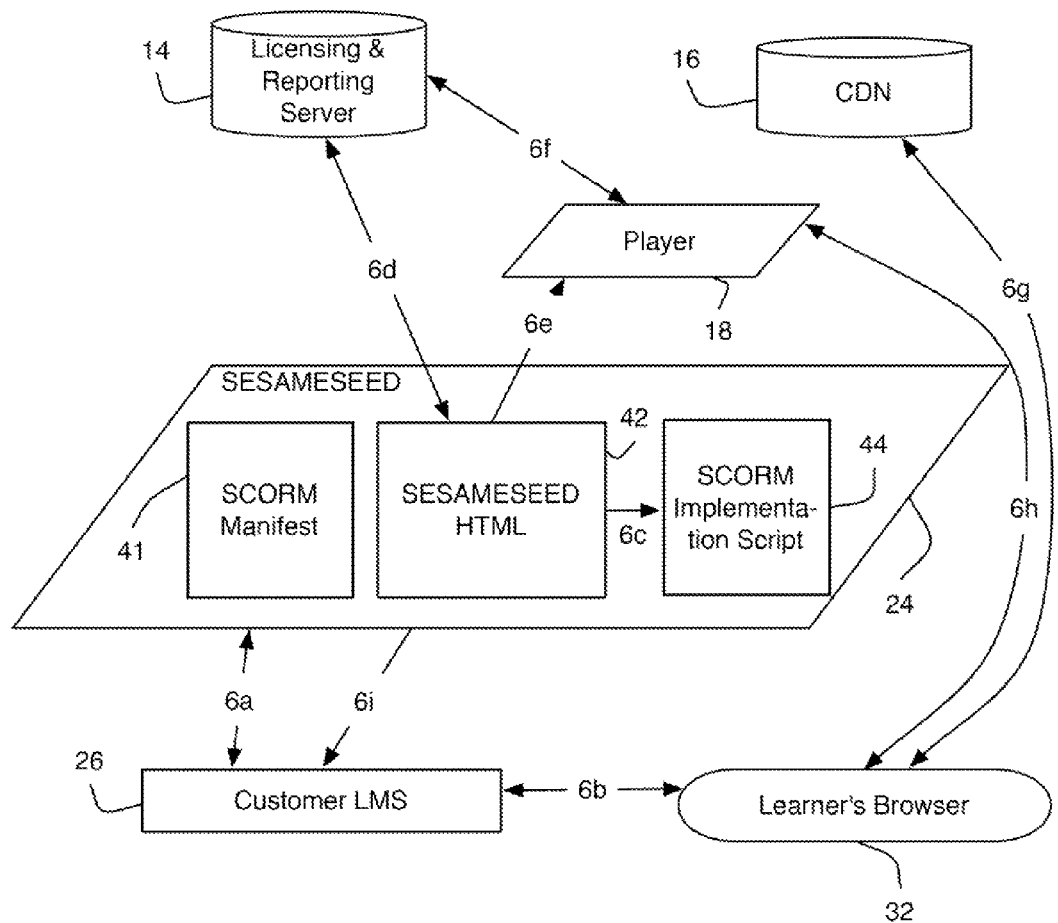
FIG. 6 illustrates a runtime block and flow diagram of the system (e.g., OPENSESAME) architecture and highlights the role of the proxy (e.g. SESAMESEED) part thereof, using SCORM, in accordance with an embodiment of the invention.
Figure 7:
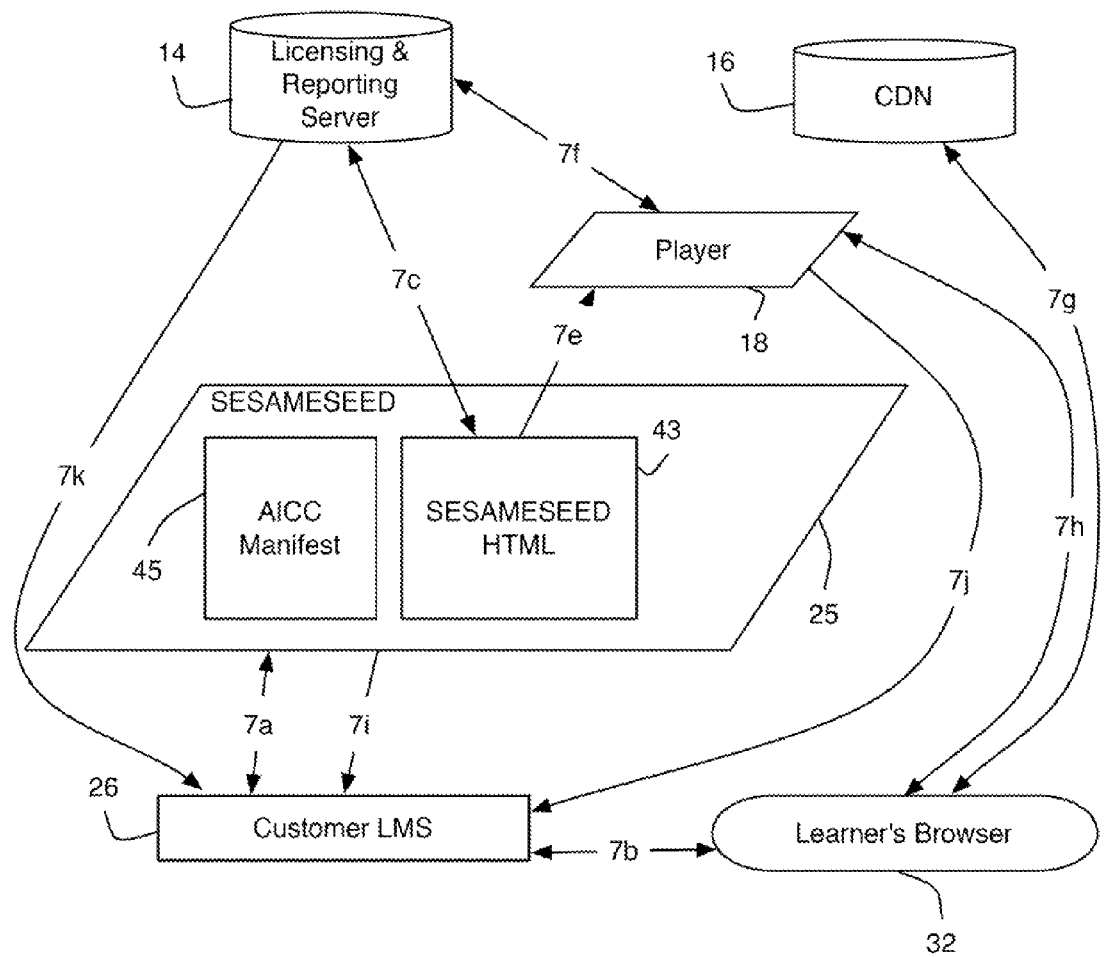
FIG. 7 illustrates a runtime block and flow diagram of the system (e.g., OPENSESAME) architecture and highlights the role of the proxy (e.g. SESAMESEED) part thereof, using AICC, in accordance with an embodiment of the invention.

FIGS. 6 and 7 are runtime block and flow diagrams of the SESAMESEED and other operative components of the invented system and method of FIGS. 1-5. Those with skill will appreciate that identical elements in the embodiment of FIGS. 6 and 7 are designated identically as in FIGS. 1-4. Although the SESAMESEED proxy 24 is typically loaded to and remains resident in the user's (e.g., a learner) browser during content viewing, the SESAMESEED proxy 24 in FIGS. 6 and 7 are shown separately solely for descriptive clarity and simplicity, and a functional or structural separation is not intended and should not be inferred from FIGS. 6 and 7.

FIG. 6 illustrates an embodiment of the SESAMESEED as a standards-based, e.g. SCORM package, and as such consists of a SCORM manifest (XML) file 4U a SCORM runtime implementation script (JAVASCRIPT files) 44, and an HTML page (e.g., SESAMESEED HTML file) 42. The manifest is a file or set of files which describe the contents or location of an e-learning course. In particular, the SCORM manifest file describes the contents of the SCORM package according to the SCORM standard. The implementation script generally comprises coded instructions that provide a common interface enabling standards-compliant content and players to communicate. In at least one embodiment, the implementation script is not contained in the proxy as originally delivered to the user's LMS, but is later downloaded from the licensing/reporting server to the learner's browser in response to a request from the HTML page.

The HTML page contains the minimal HTML and JAVASCRIPT tags and calls necessary to conform to the SCORM or other standard along with an authorization script.

FIG. 7 illustrates an embodiment of the SESAMESEED as a standards-based, e.g. AICC package, and as such consists of an AICC manifest consisting of four files (.au, .des, .cst, .crs) (e.g. AICC manifest) 45 and, in one embodiment, an HTML page (e.g. SESAMESEED HTML file) 42. In another embodiment, the AICC manifest 45 is configured to instruct the LMS to load the SESAMESEED HTML file 42 from a remote location rather than from the LMS. In this embodiment, SESAMESEED HTML file is not initially included in the SESAMESEED, but is instead loaded into the browser from any of the licensing/reporting server, the CDN, or the player.

These SESAMESEED files are all packaged, for example, into a zip archive or other compressed form, if compression is used in an embodiment. The HTML page is generally configured to receive the SCORM manifest and SCORM implementation script, for example, for operation within a learner's browser.

The SESAMESEED proxy 24 generally contains no training content as an intended security precaution against the pirating or unauthorized use, e.g. viewing, of content. An ordinarily skilled artisan will appreciate that the abstraction of the content ('content abstraction') from the LMS 26 also supports the ability to update content centrally.

At 6a, when the SESAMESEED proxy is loaded into the customer LMS 26, the LMS creates and stores a copy of the files contained therein, extracting or decompressing the SCORM package. The LMS then parses the manifest file 41 and stores metadata from the manifest, including the location where it stored the SESAMESEED proxy files and which page to send to the learner's web browser when the learner 32 requests the course. This information is typically presented to the user on an HTML page served by the customer LMS 26 in response to the user requesting the course. Note that the SESAMESEED files are loaded into the LMS system.

At 6b, a user, via their browser, requests an OPENSESAME course from his or her LMS. In response, the LMS looks up the location of the SESAMESEED proxy 24's HTML launch page as previously specified in the manifest XML file and as stored in the LMS and returns the location to the learner's browser. The browser then requests the launch page, (e.g. SESAMESEED HTML) from the LMS, which then delivers the page in response.

At 6c, in an embodiment of the invention, upon being loaded by the learner's browser, the SESAMESEED proxy's HTML page first instructs the learner's browser to instruct the SCORM runtime implementation script to initialize the LMS SCORM runtime, which creates an instance of the SCORM JAVASCRIPT runtime and discovers the LMS SCORM API according to the appropriate SCORM standard. In general, the SCORM runtime comprises a set of instructions loaded to the browser that enable a learner to load and interact with content, and enable content to interact with a player, including responding to commands from the content being played. As a SCORM package, the SESAMESEED proxy 24 uses this runtime software to communicate with the customer LMS 26 to report status updates, as at 6i described below.

At 6d, the SESAMESEED HTML page then instructs the browser to request an authorization script via a JAVASCRIPT script, which makes an HTTP request to the OPENSESAME licensing/reporting server 14. This request provides as parameters the location of the requested script, its own license identifier, and the user identifier supplied to the SESAMESEED proxy SCORM package by the LMS.

The licensing server 14 returns a script to the browser containing code that the authorization script then executes. Execution of this script results in an access denied message being displayed to the user or, if access is granted, then the SCORM implementation script 44 instructs the browser to load the player 18 with the parameters and identifiers necessary to supply the content and to begin the user's interaction with the course. In an embodiment, this process is the same each time the user launches the course, and the licensing/ reporting server logs all such requests for the purposes of reporting and limiting access to the number of users for whom the training manager has purchased access.

At 6e, if authorized, the SESAMESEED HTML instructs the browser to request the OPENSESAME course runtime corresponding to the course from the player. This request supplies the user information provided by the LMS as well as the license identification to the OPENSESAME player.

At 6f, the OPENSESAME player uses these parameters to record the learner's successful request (which has the effect of reserving one purchased license for that user) and to request an encoded URL to the actual content, which is then delivered to the player from the licensing/reporting server 14. By this mechanism, the invention utilizes CDN security APIs to prevent unauthorized access to the content. The CDN security APIs differ by vendor, so the invented OPENSESAME system utilizes multiple CDNs for the sake of performance and fault-tolerance. As a result, implementation of a given instantiation of the invented system, and by extension the level of security provided, will vary by CDN vendor.

At 6g-6h, the actual content files and the appropriate required runtime (SCORM or AICC) are delivered to the learner's browser via the OPENSESAME player. Those with skill in the art will appreciate that such content delivery may result from and/or be in response to many requests as the user progresses through a course.

At 6i, when the SESAMESEED proxy detects a status update from the player, the SESAMESEED proxy communicates the update to the LMS via the SCORM or AICC (for example) runtime provided by the LMS. In order to relay user progress and course results that are stored by the OPENSESAME player and the licensing/reporting server into the LMS via SCORM, the SESAMESEED proxy functions as a proxy for such status reporting. To accomplish this, the SESAMESEED proxy remains resident in the learner's web browser and monitors for status updates from the OPENSESAME player. When a status update is detected, the SESAMESEED proxy communicates with the LMS via the SCORM runtime provided by the LMS. It is by this mechanism that the LMS is notified when the user completes or fails a course and what their scores are (if such information is provided by the courseware).

At 7a, when the SESAMESEED proxy 25 is loaded into the customer LMS 26, the LMS creates and stores a copy of the files contained therein, extracting or decompressing the AICC package. The LMS then parses the manifest file 45 and stores metadata from the manifest, including the location where it stored the SESAMESEED proxy files and which page to send to the learner's web browser when the learner 32 requests the course. This information is typically presented to the user on an HTML page 43 served by the customer LMS 26 in response to the user requesting the course. Note that the SESAMESEED files are loaded into the LMS system.

At 7b, a user, via their browser, requests an OPENSESAME course from his or her LMS. In response, the LMS looks up the location of the SESAMESEED proxy's HTML launch page 43 as previously specified in the manifest file 45 and as stored either in the LMS or on the OPENSESAME system (e.g. the licensing/reporting server, the CDN, or the player), and returns the location to the learner's browser. The browser then requests the launch page, (e.g. SESAMESEED HTML 43) from the device/location indicated in the manifest 45, and that device/location then delivers the page in response.

At 7c, in an embodiment of the invention, upon being loaded by the learner's browser, the SESAMESEED proxy's HTML page 43 instructs the browser to request an authorization script via a JAVASCRIPT script, which makes an HTTP request to the OPENSESAME licensing/reporting server 14. This request provides as parameters the location of the requested script, its own license identifier, and the user identifier supplied to the SESAMESEED proxy by the LMS.

The licensing server 14 returns a script to the browser containing code that the authorization script then executes. Execution of this script results in an access denied message being displayed to the user or, if access is granted, instructs the browser to load the player 18 with the parameters and identifiers necessary to supply the content and to begin the user's interaction with the course. In an embodiment, this process is the same each time the user launches the course, and the licensing/reporting server logs all such requests for the purposes of reporting and limiting access to the number of users for whom the training manager has purchased access.

At 7e, if authorized, the SESAMESEED HTML 43 instructs the browser to request from the player the OPENSESAME course runtime corresponding to the course. This request supplies the user information provided by the LMS as well as the license identification to the OPENSESAME player.

At 7f, the OPENSESAME player uses these parameters to record the learner's successful request (which has the effect of reserving one purchased license for that user), and to request an encoded URL to the actual content. The encoded URL is then delivered to the player from the licensing/reporting server 14. By this mechanism, the invention utilizes CDN security APIs to prevent unauthorized access to the content. The CDN security APIs differ by vendor, so the invented OPENSESAME system utilizes multiple CDNs for the sake of performance and fault-tolerance. As a result, implementation of a given instantiation of the invented system, and by extension the level of security provided, will vary by CDN vendor.

At 7g-7h, the actual content files and the appropriate required runtime (SCORM or AICC) are delivered to the learner's browser via the OPENSESAME player. Those with skill in the art will appreciate that such content delivery may result from and/or be in response to many requests as the user progresses through a course.

Those with skill in the art will appreciate that AICC embodiments generally differ from SCORM embodiments in the way that status messages are received by an LMS. In order to relay user progress and course results that are stored by the OPENSESAME player and the licensing/reporting server into the LMS via AICC, messages are sent to an AICC request processor resident on the LMS server, not a runtime that is loaded into the browser as in SCORM.

FIG. 7 illustrates at 7i, 7j, and 7k three different implementations according to alternative embodiments.

At 7i, when the SESAMESEED proxy detects a status update, the SESAMESEED proxy communicates the update to the LMS.

At 7j, when the OPENSESAME player detects a status update, the OPENSESAME Player communicates the update to the LMS.

At 7k, when the licensing/reporting server detects a status update, the licensing/reporting server communicates the update to the LMS.

Figure 8:
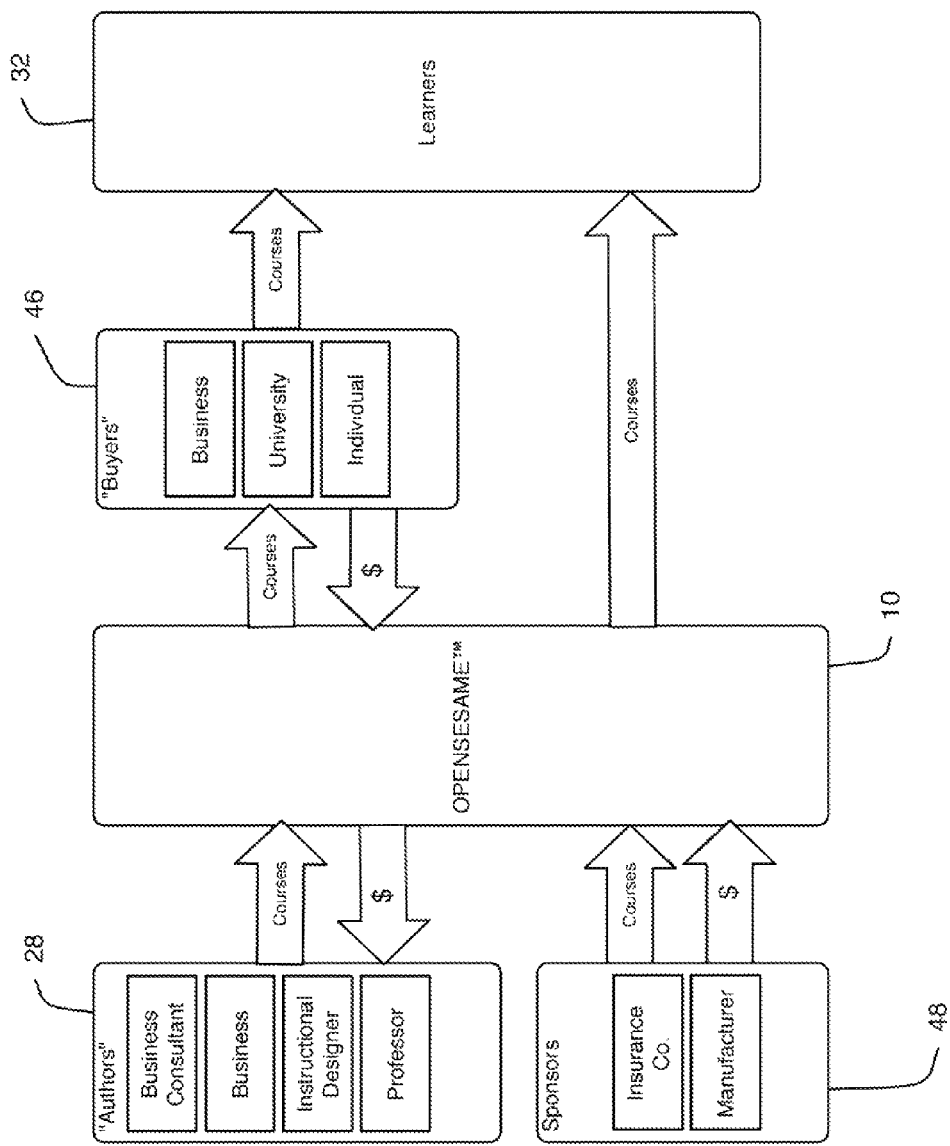
FIG. 8 illustrates a monetization and business model enabled by the invented system and method, according to an embodiment of the invention.

FIG. 8 illustrates an embodiment of a monetization/business model enabled by the invented system and method. The illustrated model includes the OPENSESAME system 10 as described and illustrated herein. The model also includes authors 28 and learners 32, as described above. Authors 28 may include professors, instructional designers, business leaders, business consultants, etc., any or all of whom may supply courses or other content to the OPENSESAME system 10 in exchange for money or other consideration. Authors can be individuals, teams, committees, etc. Learners 32 may include individuals, teams of individuals, traditionally enrolled students, employees, business consultants, etc. or others involved in continuing education, any or all of whom launch, 'attend' and complete courses.

An embodiment of the model further includes buyers 46 who might buy courses from the OPENSESAME system 10 for money or other consideration, and who act as intermediaries between the OPENSESAME system and the learners. Buyers 46 may include businesses, universities, individuals, etc. The model may further include sponsors 48 who supply courses and money or other consideration to the OPENSESAME system, so that the sponsors' courseware can be made available in an expanded e-learning marketplace to a broad number of learners via OPENSESAME system buyers, as shown. Sponsors 48 may include insurance companies, manufacturers, etc.

Those having skill in the art will appreciate that the monetization/business model may include pay-for-play, on-line PAYPAL-type authorizations or installment payment schema, that it may include individual learner or multiple learner site licenses representing per-learner discounts, that it may include courseware (multiple courses) discounts and/or bundling or even aggregation into diploma or degree curricula, and that it may include advertisements embedded in courseware to defray costs of development or marketing, although the embodiments are not so limited. (PAYPAL is a trademark owned by PayPal, Inc.). Those with skill will also appreciate that an embodiment may include survey/poll or webinar interactions, that it may include a problem/suggestion reporting mechanism, and/or that parts of it may be more closely coupled, e.g. integrated, with LMSs in order to better utilize new and improved LMS-specific capabilities. Any and all such suggested or equivalent modifications to and extensions of the invented OPENSESAME system and method and the above-described monetization/business model are contemplated as being within the spirit and scope of the invention.

Thus, a robust but open and interactive e-learning experience is unlocked by the use of the invented system and method. Authors are encouraged to submit content, training managers are encouraged to approve and recommend such content, and learners are encouraged to read and understand such content in a system of unparalleled utility and security. The user need not learn an arcane or different interface, since the content is made to play via visual and functional interfaces that are familiar to them. The difference is that more content is available because of monetary or other incentives given to authors to publish on-line courseware.

Those with skill in the art will appreciate that most of the machinery of the present invention (as depicted in the several drawing figures) can take the form of software or firmware stored in a memory for execution by a digital processor or other general-purpose computing element that is configured by specific instructions as a special-purpose computing machine. For example, the proprietary or third-party servers described herein all have such computerized machinery in them, as do user devices such as desktop or laptop computers, or hand-held digital devices such as personal digital assistants (PDAs), and mobile phones such as IPHONE® or DROID™ (IPHONE is a trademark owned by Apple Computer, Inc.; DROID is a trademark owned by Lucasfilm Ltd.). Such software and/or firmware can be programmed in any suitable language and stored in object form in a memory device for execution by a suitable instruction processor thereby to realize the invention's utility.

In general, reference to a 'server' herein indicates a computing device configured as a server, including device executable instructions configured, when executed on a computing device, to enable the computing device to function as a server, as described herein. Such servers will, in most cases, also be operably coupled with, or configured to enable operable connection with, a data transfer network. Although several types of servers may be described with reference to a single embodiment of the invention, an ordinarily skilled artisan will recognize that a single computing device can be suitably configured with programming and/or circuitry to perform as two or more of the listed servers in at least one embodiment.

It will be understood that the present invention is not limited to the method or detail of construction, fabrication, material, application or use described and illustrated herein. Indeed, any suitable variation of fabrication, use, or application is contemplated as an alternative embodiment, and thus is within the spirit and scope, of the invention.

It is further intended that any other embodiments of the present invention that result from any changes in application or method of use or operation, configuration, method of manufacture, shape, size, or material, which are not specified within the detailed written description or illustrations contained herein yet would be understood by one skilled in the art, are within the scope of the present invention.

Finally, those with skill in the art will appreciate that the invented method, system and apparatus described and illustrated herein may be implemented in software, firmware or hardware, or any suitable combination thereof. Preferably, the method system and apparatus are implemented in a combination of the three, for purposes of low cost and flexibility. Thus, those with skill in the art will appreciate that embodiments of the methods and system of the invention may be implemented by a computer or microprocessor process in which instructions are executed, the instructions being stored for execution on a computer-readable medium and being executed by any suitable instruction processor.

Accordingly, while the present invention has been shown and described with reference to the foregoing embodiments of the invented apparatus, it will be apparent to those skilled in the art that other changes in form and detail may be made therein without departing from the spirit and scope of the invention as defined in the appended claims.

We claim:

1. An e-learning delivery system, comprising:
a licensing/reporting server;
a network-side content player operably coupled with each of the licensing/reporting server and a content delivery network comprising stored e-learning content; and
a proxy comprising coded instructions stored on a non-transitory computing device-readable medium at the network-side, wherein the proxy instructions identify a specific instance of licensed content, and wherein the proxy instructions are configured when executed on a client-side computing device to enable a user to access and interact with the licensed content via a browser of the computing device and are further configured to report a status of the user's interaction with the content to one or both of the licensing/reporting server and a learning management system (LMS);
wherein the licensing/reporting server includes coded instructions configured when executed to cause the licensing/reporting server to verify a validity status of the user license to the specific instance of content, and upon verifying the validity of the license, the instructions are further configured to cause the licensing/reporting server to provide to the proxy a location designator for accessing the content player;

wherein the proxy instructions are further configured, when executed on the client-side computing device in response to a request for access to the specific instance of content, to:

cause the client-side computing device to request verification by the licensing/reporting server of the validity status of a license to the specific instance of content; and cause the client-side computing device to instruct a browser to access the content player via the location designator; and wherein the proxy instructions are further configured to relay information to a client-side Learning Management System (LMS) including information indicating a status of content played by the content player.

2. The e-learning system of claim 1, further comprising: a network-side e-learning course catalog comprising coded instructions configured when executed on a computing device to request that the licensing/reporting server create a license to the specific instance of content in response to a user request.

3. The e-learning system of claim 1, wherein the Licensing/reporting server is configured with instructions stored on a non-transitory computing-device-readable medium, and wherein the licensing/reporting server instructions are configured, when executed in response to a failed user license verification, to cause the licensing/reporting server to notify the proxy that the requested access is denied.

4. The e-learning system of claim 1, wherein the proxy is operably compliant with either or both of the Shamble Content Object Reference Model (SCORM) and the Aviation industry Computer-Based Training Committee (MCC) e-learning standards.

5. A method for delivering e-learning standard-compliant content, comprising:

receiving a request from a learning management system of a user to access content residing on a content delivery network (CDN);

configuring a proxy with license information indicating a specific instance of licensed content, the configuring being performed by a network-side licensing/reporting server in response to the request;

providing the proxy to the user;

receiving, at the licensing/reporting server, a license verification request from the proxy;

providing, from the licensing/reporting server to the proxy in response to a successful license verification request received from the proxy, the content player location designator, wherein the proxy is further configured to instruct a learner's browser to load a content-specific course runtime from the content player;

loading the course runtime from the content player to the learner's browser;

instructing the learner's browser to request the licensed content from a content delivery network (CDN), the instructing being performed by the course runtime;

loading, the licensed content from the CDN to the learner's browser;

reporting, from the content player to either or both of the licensing/reporting server and the proxy, the learner's status relative to the content; and reporting from the proxy to the user's LMS the learner's status relative to the content.

6. The content delivery method of claim 5, further comprising:

providing a network-linked content player, the content player being accessible to a learner's browser via a location designator.

7. The content delivery method of claim 5, further comprising:

receiving at the licensing/reporting server a rating of e-learning content provided from a user.

8. The content delivery method of claim 7, further comprising:

storing the rating information at a network-side catalog operably coupled with the licensing/reporting server.

9. The content delivery method of claim 5, wherein the license information of the proxy is configured, when received by either or both of the license/reporting server and the CDN as part of a request to access licensed content, to be used by the licensing/reporting server and/or the CDN respectively to limit a number of instances that the content can be accessed via the location designator.

10. The content delivery method of claim 5, wherein the proxy is operably compliant with one or both of Sharable Content Object Reference Model (SCORM) and Aviation industry Computer-Based Training Committee (AICC) e-learning standards.

11. An e-learning proxy comprising:

instructions stored on a non-transitory computing-device-readable medium, wherein the instructions are configured when executed on a computing device to cause the computing device to:

send a request to a network-side licensing/reporting server to verify a license to a specific instance of content in response to a learner's request for access to the content;

receive from the licensing/reporting server, in response to a successful verification of the license, a location designator for a content player; and instruct a learner's browser to access and load the content player via the location designator;

wherein:

the proxy instructions include license information rendering the proxy specific to the specific instance of licensed content;

the proxy itself does not contain any e-learning course content;

the proxy is configured to be loaded from the user's LMS to the learner's browser in response to a request from the learner for access to the licensed content;

the proxy instructions are configured, when the proxy is loaded to the learner's browser, to instruct the implementation script to initialize a runtime compliant with the e-learning standard; and the proxy instructions are further configured to use the runtime to communicate with the LMS and to report status updates of the learner's interaction with the content.

12. The e-learning proxy of claim 11, wherein the proxy further comprises:

an e-learning standard-based manifest.

13. The e-learning proxy of claim 11, wherein the proxy further comprises:

an e-learning standard-based implementation script.

14. The e-learning proxy of claim 11, wherein the proxy further comprises:

a hypertext markup language (HTML) page configured to receive, for operation within a learner's browser, either or both of an e-learning standard-based manifest and an e-learning standard-based implementation script.

15. The e-learning proxy of claim 11, wherein the proxy is operably compliant with one or both of Shamble Content Object Reference Model (SCORM) and Aviation Industry Computer-Based. Training Committee (AICC) e-learning standards.

16. The e-leaning proxy of claim 11, wherein the request to the network-side licensing/reporting server includes a license identifier and a user identifier.

* * * * *

UNITED STATES PATENT AND TRADEMARK OFFICE
CERTIFICATE OF CORRECTION

| | |
|---|---|
| PATENT NO. | : 8,784,113 B2 |
| APPLICATION NO. | : 13/156607 |
| DATED | : July 22, 2014 |
| INVENTOR(S) | : Bridges et al. |

It is certified that error appears in the above-identified patent and that said Letters Patent is hereby corrected as shown below:

In the Claims

Column 17:
  Claim 3 at line 26, delete "wherein the Licensing/reporting server is" and insert --wherein the licensing/reporting server is--

Column 17:
  Claim 4 at line 34, delete "with either or both of the Shamble Content" and insert --with either or both of the Sharable Content--

Column 17:
  Claim 4 at line 35, delete "Aviation industry Computer-Based Training Committee (MCC)" and insert --Aviation Industry Computer-Based Training Committee (AICC)--

Column 19:
  Claim 15 at line 4, delete "compliant with one or both of Shamble Content" and insert --compliant with one or both of Sharable Content--

Column 19:
  Claim 16 at line 8, delete "The e-leaning proxy of" and insert --The e-learning proxy of--

Signed and Sealed this
Twenty-first Day of October, 2014

Michelle K. Lee
*Deputy Director of the United States Patent and Trademark Office*

UNITED STATES PATENT AND TRADEMARK OFFICE
CERTIFICATE OF CORRECTION

PATENT NO. : 8,784,113 B2  
APPLICATION NO. : 13/156607  
DATED : July 22, 2014  
INVENTOR(S) : Aaron H. Bridges et al.

Page 1 of 1

It is certified that error appears in the above-identified patent and that said Letters Patent is hereby corrected as shown below:

On the title page item "(76)" should read --(75)--

On the title page insert item (73),

-- OpenSesame Inc., Portland, OR (US) --

Signed and Sealed this  
Third Day of November, 2015

Michelle K. Lee  
*Director of the United States Patent and Trademark Office*